US011273554B2

(12) United States Patent
Doan et al.

(10) Patent No.: US 11,273,554 B2
(45) Date of Patent: Mar. 15, 2022

(54) METHOD AND DEVICE FOR EVALUATING CALIBRATION PRECISION

(71) Applicant: Nidec Corporation, Kyoto (JP)

(72) Inventors: Thanh Nhat Doan, Kyoto (JP); Haruhiro Tsuneta, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 430 days.

(21) Appl. No.: 16/369,009

(22) Filed: Mar. 29, 2019

(65) Prior Publication Data

US 2019/0299418 A1 Oct. 3, 2019

(30) Foreign Application Priority Data

Mar. 30, 2018 (JP) .............................. JP2018-068174

(51) Int. Cl.
*B25J 9/16* (2006.01)

(52) U.S. Cl.
CPC .......... *B25J 9/1692* (2013.01); *B25J 9/1653* (2013.01); *B25J 9/1664* (2013.01)

(58) Field of Classification Search
CPC ...... B25J 9/1692; B25J 9/1653; B25J 9/1664; B25J 19/0095; B25J 9/1694
See application file for complete search history.

(56) References Cited

U.S. PATENT DOCUMENTS

| 10,786,904 B2* | 9/2020 | Gu ............................ B25J 11/00 |
| 2004/0010345 A1* | 1/2004 | Kim ....................... B25J 9/1692 |
| | | 700/254 |
| 2009/0190826 A1* | 7/2009 | Tate ................... H04N 1/00087 |
| | | 382/153 |
| 2011/0282492 A1* | 11/2011 | Krause .................. B25J 9/1664 |
| | | 700/259 |
| 2015/0258688 A1* | 9/2015 | Suzumura ............. B25J 9/1692 |
| | | 700/254 |
| 2017/0113351 A1* | 4/2017 | Yoshino ................ B25J 9/1692 |
| 2018/0194008 A1* | 7/2018 | Namiki ..................... G06T 7/80 |
| 2018/0200886 A1* | 7/2018 | Wang ..................... B25J 9/1692 |
| 2018/0243911 A1* | 8/2018 | Harada .................. B25J 9/1697 |
| 2020/0408510 A1* | 12/2020 | Drouin .................. G01B 11/22 |

FOREIGN PATENT DOCUMENTS

| JP | 2983941 B2 | 11/1999 |
| JP | 2012-104153 A | 5/2012 |
| JP | 2013-039643 A | 2/2013 |

* cited by examiner

*Primary Examiner* — Robert T Nguyen
(74) *Attorney, Agent, or Firm* — Keating & Bennett

(57) ABSTRACT

A method of evaluating calibration precision includes a setting step of setting a three-dimensional lattice structure including lattice points and a movement instructing step of moving an arm tip of a calibrated robot from a first lattice point to a second lattice point spaced from the first lattice point. The method includes a calculating step of calculating a difference between a movement instruction value given to the robot and an actual distance by which the arm tip of the robot is moved. The method includes a repeat controlling step of repeating the movement instructing step and the calculating step multiple times using a pair of lattice points other than the first and second lattice points and a presenting step of presenting differences obtained by the repeat controlling step.

5 Claims, 5 Drawing Sheets

METHOD AND DEVICE FOR EVALUATING CALIBRATION PRECISION

CROSS REFERENCE TO RELATED APPLICATIONS

This application claims the benefit of priority to Japanese Patent Application No. 2018-068174 filed on Mar. 30, 2018. The entire contents of this application are hereby incorporated herein by reference.

BACKGROUND OF THE INVENTION

1. Field of the Invention

The present disclosure relates to a method and a device for evaluating calibration precision.

2. Description of the Related Art

As a multi-joint robot, a six-axis robot is known. When the six-axis robot is assembled in a factory or the like, it is difficult to assemble the robot according to a design value, and the assembled robot often has an assembly error. Calibration is usually performed to reduce the assembly error. Conventionally, there has been known a method of measuring a shift amount of an offset between axes of the six-axis robot to calibrate the shift amount.

In the conventional method, it is difficult to evaluate whether the calibration of the offset has been correctly performed.

SUMMARY OF THE INVENTION

According to an aspect of an example embodiment of the present disclosure, a method of evaluating calibration precision includes a setting step of setting a three-dimensional lattice structure including a plurality of lattice points and a movement instructing step of moving an arm tip of a calibrated robot from a first lattice point of the three-dimensional lattice structure to a second lattice point which is spaced a certain distance from the first lattice point. In addition, the method includes a calculating step of calculating a difference between a movement instruction value given to the robot and an actual distance by which the arm tip of the robot is moved, a repeat controlling step of repeating the movement instructing step and the calculating step a certain number of times using a pair of the plurality of lattice points other than the first and second lattice points, and a presenting step of presenting a plurality of differences obtained by the repeat controlling step.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Hereinafter, example embodiments for carrying out the present disclosure will be described in detail with reference to the accompanying drawings. The following example embodiments are to be considered as illustrative examples for achieving the present disclosure and may be corrected or modified as required depending on a configuration or other various conditions of a device or a system according to the present disclosure. The present disclosure is not limited to the following example embodiments.

Figure 1:
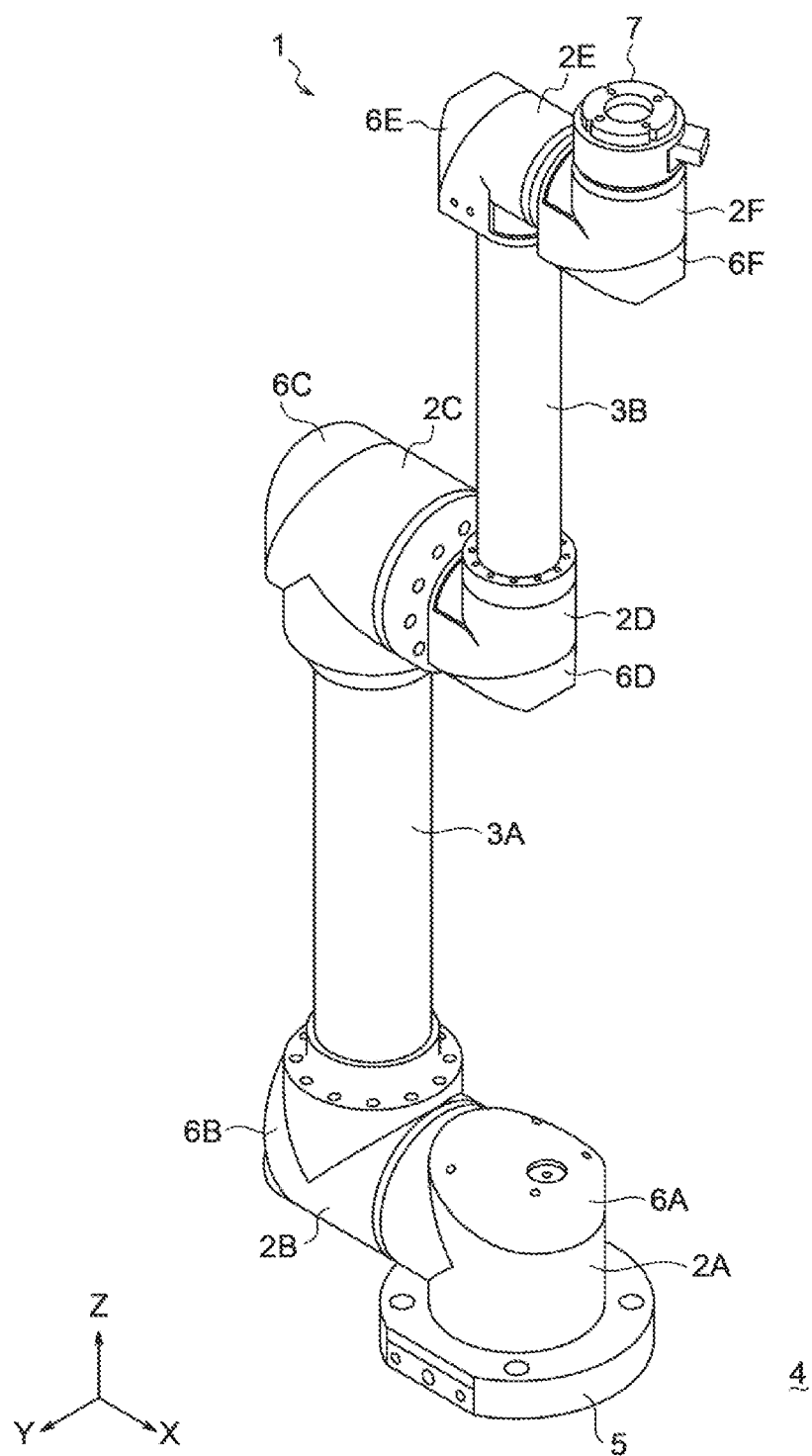
FIG. 1 is a perspective view illustrating a six-axis robot according to an example embodiment of the present disclosure.
Figure 2:
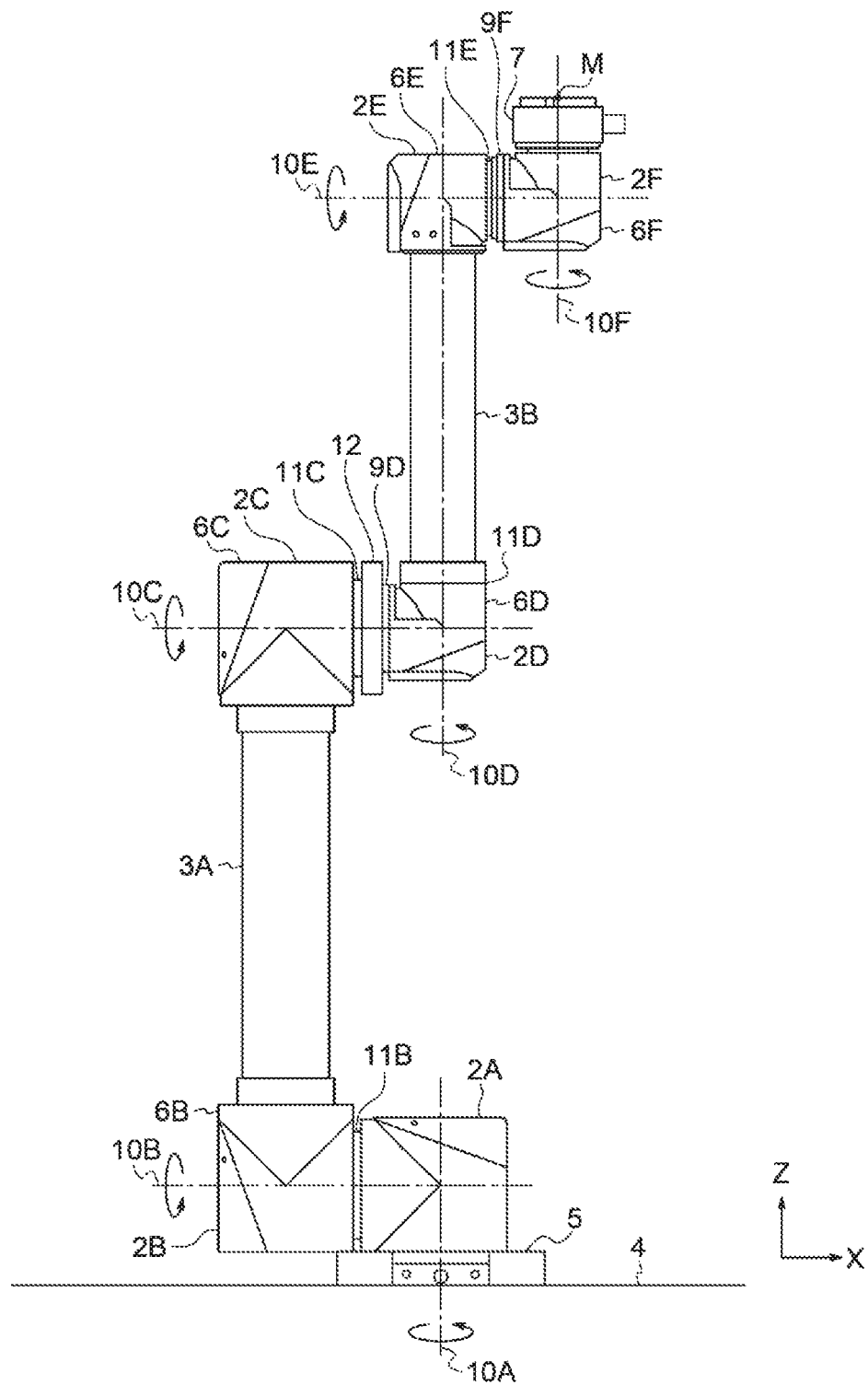
FIG. 2 is a left side view illustrating the six-axis robot shown in FIG. 1.

FIG. 1 is a perspective view illustrating a robot 1 according to an embodiment of the present disclosure. For convenience of description, in FIG. 1, an upward direction is referred to as a Z direction, a left direction is referred to as a Y direction, and a forward direction is referred to as an X direction. The Z direction is a height direction of the robot 1. In addition, a direction opposite to the Z direction is referred to as a downward direction, and the same direction as the Z direction is referred to as the upward direction. FIG. 2 is a left side view illustrating the robot 1 shown in FIG. 1.

The robot 1 of the present embodiment is a six-axis robot that is usable for assembling or manufacturing a certain product and is installed and used, for example, in an assembly line or a manufacturing line. As shown in FIGS. 1 and 2, the robot 1 includes six rotary joints 2A to 2F and two arms 3A and 3B. In the following description, the six rotary joints 2A to 2F are referred to as a first rotary joint 2A, a second rotary joint 2B, a third rotary joint 2C, a fourth rotary joint 2D, a fifth rotary joint 2E, and a sixth rotary joint 2F in order from a robot mounting surface 4. In addition, the two arms 3A and 3B are referred to as a first arm 3A and a second arm 3B in order from the robot mounting surface 4. FIG. 1 shows a state in which the robot 1 is erected in a direction substantially perpendicular to the robot mounting surface 4.

The robot 1 includes a support member 5 constituting a base end portion of the robot 1. The support member 5 is fixed to the mounting surface 4. The first rotary joint 2A is connected to be relatively rotatable with respect to the support member 5.

The first arm 3A and the second arm 3B are formed in an elongated cylindrical shape. An outer diameter of the second arm 3B is smaller than an outer diameter of the first arm 3A. The second arm 3B is shorter than the first arm 3A.

The first rotary joint 2A and the second rotary joint 2B are connected to be relatively rotatable to each other, and the second rotary joint 2B and a base end (lower end) of the first arm 3A are fixed. A tip of the first arm 3A and the third rotary joint 2C are fixed, and the third rotary joint 2C and the fourth rotary joint 2D are connected to be relatively rotatable to each other. The fourth rotary joint 2D and a lower end of the second arm 3B are connected to be relatively rotatable to each other, and a tip of the second arm 3B and the fifth rotary joint 2E are fixed. The fifth rotary joint 2E and the sixth rotary joint 2F are connected to be relatively rotatable to each other. The sixth rotary joint 2F is provided with an attachment portion 7 to which an end effector or the like (not shown) is attachable to be relatively rotatable.

Each of the first to sixth rotary joints 2A to 6F includes a motor (not shown), a decelerator (not shown) connected to the motor, a position detection mechanism (not shown) configured to detect a rotational position of the motor, a circuit board (not shown) to which the motor and the position detection mechanism are electrically connected, and a case body 6A, 6B, 6C, 6D, 6E, or 6F in which the motor, the decelerator, the position detection mechanism, and the circuit board are accommodated. Each motor is connected to a controller (not shown) configured to control the motor in a wireless or wired manner.

The support member 5 and the first rotary joint 2A are connected by fixing an output side member (not shown) of the first rotary joint 2A to the support member 5. The support member 5 and the first rotary joint 2A are connected such that a central axis 10A of the first rotary joint 2A and a central axis of the support member 5 coincide with each other.

The first rotary joint 2A and the second rotary joint 2B are connected such that the central axis 10A of the first rotary joint 2A and a central axis 10B of the second rotary joint 2B are orthogonal to each other. In addition, the case body 6A of the first rotary joint 2A and a flange portion 11B of the second rotary joint 2B are directly fixed. As described above, the first rotary joint 2A and the flange portion 11B of the second rotary joint 2B are directly fixed such that the central axis 10A of the first rotary joint 2A and the central axis 10B of the second rotary joint 2B are orthogonal to each other. Furthermore, the first rotary joint 2A and the second rotary joint 2B may be rotated about the central axis 10A of the first rotary joint 2A as a rotation axis with respect to the support member 5.

The second rotary joint 2B and the first arm 3A are connected such that the central axis 10B of the second rotary joint 2B and a central axis in a length direction of the first arm 3A are orthogonal to each other. In addition, the lower end of the first arm 3A is fixed to the case body 6B of the second rotary joint 2B.

The first arm 3A and the third rotary joint 2C are connected such that the central axis in the length direction of the first arm 3A and a central axis 10C of the third rotary joint 2C are orthogonal to each other. Furthermore, the tip of the first arm 3A is fixed to the case body 6C of the third rotary joint 2C. The central axis 10C is parallel to the central axis 10B.

The third rotary joint 2C and the fourth rotary joint 2D are connected such that the central axis 10C of the third rotary joint 2C and a central axis 10D of the fourth rotary joint 2D are orthogonal to each other. In addition, an attachment surface 9D of the case body 6D of the fourth rotary joint 2D and a flange portion 11C of the third rotary joint 2C are fixed through a connection member 12 having a certain thickness (length) along the central axis 10C of the third rotary joint 2C. The central axis 10D and the central axis 10A are coaxial.

The fourth rotary joint 2D and the second arm 3B are connected to such that the central axis 10D of the fourth rotary joint 2D and a central axis in a length direction of the second arm 3B coincide with each other. Furthermore, the lower end of the second arm 3B is fixed to a flange portion 11D of the fourth rotary joint 2D.

Therefore, the second arm 3B may be rotated about the central axis 10C of the third rotary joint 2C as a rotation axis with respect to the first arm 3A.

The second arm 3B and the fifth rotary joint 2E are connected such that the central axis in the length direction of the second arm 3B and a central axis 10E of the fifth rotary joint 2E are orthogonal to each other. In addition, the tip of the second arm 3B is connected to the case body 6E of the fifth rotary joint 2E. The central axis 10E is parallel to the central axis 10B and the central axis 10C.

The fifth rotary joint 2E and the sixth rotary joint 2F are connected such that the central axis 10E of the fifth rotary joint 2E and a central axis 10F of the sixth rotary joint 2F are orthogonal to each other. Furthermore, an attachment surface 9F of the case body 6F of the sixth rotary joint 2F and a flange portion 11E of the fifth rotary joint 2E are directly fixed.

Therefore, the second arm 3B, which is relatively rotated about the central axis 10C of the third rotary joint 2C as the rotation axis with respect to the first arm 3A, may be rotated on a plane including the central axis 10A of the first rotary joint 2A. In addition, the second arm 3B is shorter than the first arm 3A such that the first rotary joint 2A and the fifth rotary joint 2E do not interfere with the second arm 3B when the second arm 3B is rotated about the central axis 10C.

When robots are assembled in a factory or the like, it is difficult for an operator to assemble the robots according to a design value, and a robot having an assembly error occurs after the robots are assembled. Typically, calibration is performed to reduce an assembly error. The robot shown in FIGS. 1 and 2 is a robot after calibration has been performed thereon. Since various methods related to the calibration are known, detailed descriptions thereof will be omitted.

In the present embodiment, a method of evaluating whether calibration has been performed with desired precision will be described below.

Calibration precision is evaluated based on whether the attachment portion 7 for the end effector of the robot 1 is moved according to a movement instruction given to the robot 1. In the present embodiment, a laser tracker is used as a measuring instrument for measuring a position of the attachment portion 7 for the end effector. It is assumed that a mirror for reflecting a laser generated from the laser tracker is attached to position M on the attachment portion 7 for the end effector. Position M may be referred to as a position of an arm tip of the robot or a tool center position.

Figure 3:
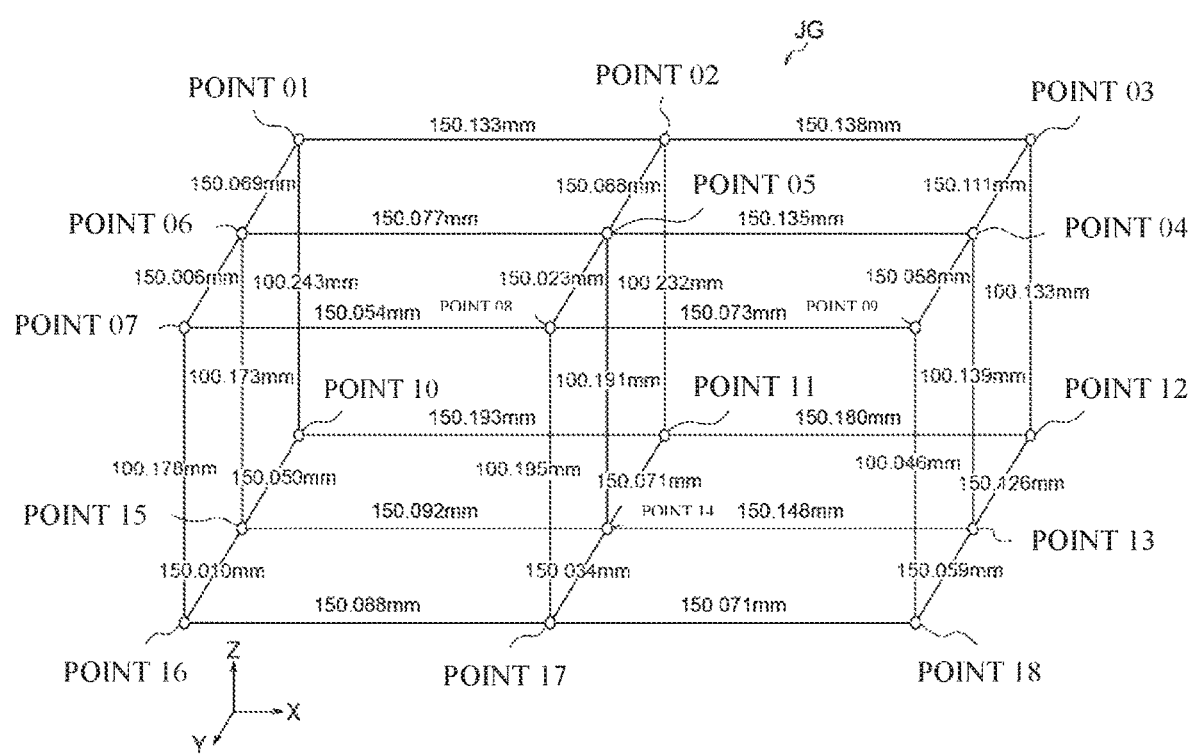
FIG. 3 is a partial perspective view illustrating a three-dimensional lattice structure used in an example embodiment of the present disclosure.

In the present embodiment, first, a three-dimensional (3D) lattice structure JG having a plurality of lattice points (points 01 to 18) is set as shown in FIG. 3.

When viewed from point 10, point 01 is 100 mm away from point 10 in a positive Z direction. Point 02 is 150 mm away from point 01 in a positive X direction. Point 03 is 150 mm away from point 02 in the positive X direction. Point 04 is 150 mm away from point 03 in a positive Y direction. Point 05 is 150 mm away from point 04 in a negative X direction. Point 06 is 150 mm away from point 05 in the negative X direction. Point 07 is 150 mm away from point 06 in the positive Y direction. Point 08 is 150 mm away from point 07 in the positive X direction. Point 09 is 150 mm away from point 08 in the positive X direction. Points 10 to 18 are 100 mm away from points 01 to 09 in a negative Z direction, respectively.

In addition, a 3D lattice structure (see FIG. 4) used for actual calibration evaluation has more lattice points than the lattice points shown in FIG. 3, but only 18 lattice points are shown in FIG. 3 for convenience of description.

After the 3D lattice structure JG is set, the attachment portion 7 for the end effector (more specifically, the mirror attached to position M, i.e., the arm tip of the robot) of the robot 1 is moved to point 01, and a position of point 01 is measured with the laser tracker. Thereafter, the arm tip of the robot is moved 150.00 mm in the positive X direction. In this case, a movement instruction for 150.00 mm movement in the positive X direction is transmitted from the controller to the robot 1 (wherein a movement instruction value is 150.00 mm). The arm tip of the robot (position M) is moved from point 01 to point 02 based on the movement instruction. A position of the arm tip of the robot moved to point 02 is measured with the laser tracker. Thereafter, a distance between the position of point 01 and the position of the arm tip of the robot moved to point 02 is calculated. That is, an actual distance by which the arm tip of the robot 1 is moved is calculated. The calculation is performed by, for example, the laser tracker. In an example of FIG. 3, an actual distance by which the arm tip is moved from point 01 to point 02 is 150.133 mm. A difference between the movement instruction value of 150.00 mm given to the robot 1 and the actual distance by which the arm tip is moved is calculated and is 0.133 mm. That is, movement precision (i.e., calibration precision) of the robot 1 is 0.133 mm after the calibration. The calibration precision of 0.133 mm is precision with respect to the 150.00 mm movement instruction. The calibration precision of 0.133 mm is calibration precision calculated with the two lattice points (point 01 and point 02), i.e., a pair of lattice points.

Next, the arm tip of the robot is moved from point 02 to point 03. In this case, a movement instruction for 150.00 mm movement in the positive X direction is transmitted from the controller to the robot 1. The arm tip of the robot is moved from point 02 to point 03 based on the movement instruction. A position of the arm tip of the robot moved to point 03 is measured with the laser tracker. Thereafter, a distance between a position of point 02 and the position of the arm tip of the robot moved to point 03 is calculated. In the example of FIG. 3, an actual distance by which the arm tip is moved from point 02 to point 03 is 150.138 mm. Therefore, calibration precision is 0.138 mm. The calibration precision of 0.138 mm is precision with respect to the 150.00 mm movement instruction. The calibration precision of 0.138 mm is calibration precision calculated with a pair of lattice points (point 02 and point 03) other than an initial pair of lattice points (point 01 and point 02).

Then, the arm tip of the robot is moved from point 03 to point 04. In this case, a movement instruction for 150.00 mm movement in the positive Y direction is transmitted from the controller to the robot 1. The arm tip of the robot is moved from point 03 to point 04 based on the movement instruction. A position of the arm tip of the robot moved to point 04 is measured with the laser tracker. Thereafter, a distance between a position of point 03 and the position of the arm tip of the robot moved to point 04 is calculated. In the example of FIG. 3, an actual distance by which the arm tip is moved from point 03 to point 04 is 150.111 mm. Therefore, calibration precision is 0.111 mm. The calibration precision of 0.111 mm is precision with respect to the 150.00 mm movement instruction.

The arm tip of the robot is sequentially moved from point 04 to point 09 to calculate calibration precision in the above-described sequence. In the example of FIG. 3, calibration precision obtained by moving the arm tip from point 04 to point 05 is 0.135 mm. Calibration precision obtained by moving the arm tip from point 05 to point 06 is 0.077 mm. Calibration precision obtained by moving the arm tip from point 06 to point 07 is 0.006 mm. Calibration precision obtained by moving the arm tip from point 07 to point 08 is 0.054 mm. Calibration precision obtained by moving the arm tip from point 08 to point 09 is 0.073 mm.

Therefore, it is possible to repeatedly calculate a difference between a movement instruction value given to the robot and an actual distance by which the arm tip of the robot 1 is moved by using eight pairs of lattice points, thereby obtaining eight calibration precision values with respect to the 150.00 mm movement instruction.

In addition, the arm tip of the robot is moved from point 09 to point 04 to calculate calibration precision in the above-described sequence. In the example of FIG. 3, calibration precision obtained by moving the arm tip from point 09 to point 04 is 0.058 mm. In addition, the arm tip of the robot is moved from point 08 to point 05 to calculate calibration precision. The calibration precision obtained by moving the arm tip from point 08 to point 05 is 0.023 mm. Furthermore, the arm tip of the robot is moved from point 05 to point 02 to calculate calibration precision. The calibration precision obtained by moving the arm tip from point 05 to point 02 is 0.088 mm. In addition, the arm tip of the robot is moved from point 06 to point 01 to calculate calibration precision. The calibration precision obtained by moving the arm tip from point 06 to point 01 is 0.069 mm. As described above, four calibration precision values with respect to the 150.00 mm movement instruction are obtained.

Therefore, a total of 12 calibration precision values with respect to the 150.00 mm movement instruction may be obtained in a plane defined by point 01, point 03, point 09, point 07, and point 01.

Next, the arm tip of the robot is moved to point 10 and then is sequentially moved from point 10 to point 18 to calculate calibration precision. In the example of FIG. 3, calibration precision obtained by moving the arm tip from point 10 to point 11 is 0.193 mm. Calibration precision obtained by moving the arm tip from point 11 to point 12 is 0.180 mm. Calibration precision obtained by moving the arm tip from point 12 to point 13 is 0.126 mm. Calibration precision obtained by moving the arm tip from point 13 to point 14 is 0.148 mm. Calibration precision obtained by moving the arm tip from point 14 to point 15 is 0.092 mm. Calibration precision obtained by moving the arm tip from point 15 to point 16 is 0.010 mm. Calibration precision obtained by moving the arm tip from point 16 to point 17 is 0.088 mm. Calibration precision obtained by moving the arm tip from point 17 to point 18 is 0.071 mm. In addition, calibration precision with respect to the 150.00 mm movement instruction is obtained by each of movements of the arm tip from point 18 to point 13, from point 17 to point 14, from point 14 to point 11, and from point 15 to point 10. Therefore, a total of 12 calibration precision values with respect to the 150.00 mm movement instruction may be obtained in a plane defined by point 10, point 12, point 18, point 16, and point 10.

Therefore, 24 calibration precision values with respect to the 150.00 mm movement instruction may be obtained using the 3D lattice structure shown in FIG. 3.

The arm tip of the robot is moved to point 01, and a position of point 01 is measured with the laser tracker. Then, the arm tip of the robot is moved 100.00 mm in the negative Z direction. In this case, a movement instruction for 100.00 mm movement in the negative Z direction is transmitted from the controller to the robot 1. The arm tip of the robot is moved from point 01 to point 10 based on the movement instruction. A position of the arm tip of the robot moved to point 10 is measured with the laser tracker. Thereafter, a distance between the position of point 01 and the position of the arm tip of the robot moved to point 10 is calculated. That is, an actual distance by which the arm tip of the robot is moved is calculated. In the example of FIG. 3, the actual distance by which the arm tip is moved from point 01 to point 10 is 100.243 mm. Therefore, movement precision (i.e., calibration precision) of the robot 1 is 0.243 mm after the calibration. The calibration precision of 0.243 mm is precision with respect to the 100.00 mm movement instruction.

Then, the arm tip of the robot is moved to point 02, and a position of point 02 is measured with the laser tracker. Thereafter, the arm tip of the robot is moved from point 02 to point 11. In this case, a movement instruction for 100.00 mm movement in the negative Z direction is transmitted from the controller to the robot 1. The arm tip of the robot is moved from point 02 to point 11 based on the movement instruction. A position of the arm tip of the robot moved to point 11 is measured with the laser tracker. Thereafter, a distance between the position of point 02 and the position of the arm tip of the robot moved to point 11 is calculated. In the example of FIG. 3, an actual distance by which the arm tip is moved from point 02 to point 11 is 100.232 mm. Therefore, calibration precision is 0.232 mm. The calibration precision of 0.232 mm is precision with respect to the 100.00 mm movement instruction.

Then, the arm tip of the robot is moved to point 03, and a position of point 03 is measured with the laser tracker. Thereafter, the arm tip of the robot is moved from point 03 to point 12. In this case, a movement instruction for 100.00 mm movement in the negative Z direction is transmitted from the controller to the robot 1. Thereafter, the arm tip of the robot is moved from point 03 to point 12 according to the movement instruction. A position of the arm tip of the robot moved to point 12 is measured with the laser tracker. A distance between the position of point 03 and the position of the arm tip of the robot moved to point 12 is calculated. In the example of FIG. 3, an actual distance by which the arm tip is moved from point 03 to point 12 is 100.133 mm. Therefore, calibration precision is 0.133 mm. The calibration precision of 0.133 mm is precision with respect to the 100.00 mm movement instruction.

The arm tip of the robot is sequentially moved from point 04 to point 13 to calculate calibration precision in the above-described sequence. In the example of FIG. 3, the calibration precision obtained by moving the arm tip from point 04 to point 13 is 0.139 mm. Calibration precision obtained by moving the arm tip from point 05 to point 14 is 0.191 mm. Calibration precision obtained by moving the arm tip from point 06 to point 15 is 0.173 mm. Calibration precision obtained by moving the arm tip from point 07 to point 16 is 0.178 mm. Calibration precision obtained by moving the arm tip from point 08 to point 17 is 0.195 mm. Calibration precision obtained by moving the arm tip from point 09 to point 18 is 0.046 mm.

Therefore, nine calibration precision values with respect to the 100.00 mm movement instruction may be obtained.

In addition, in the 3D lattice structure JG of FIG. 3, the arm tip of the robot may be moved from point 01 to point 03 to obtain a calibration precision value with respect to a 300.00 mm movement instruction. The arm tip of the robot may be moved from point 01 to point 05 to obtain a calibration precision value with respect to a 212.13 mm movement instruction. The arm tip of the robot may be moved from point 01 to point 15 to obtain a calibration precision value with respect to a 180.28 mm movement instruction. The arm tip of the robot may be moved from point 01 to point 14 to obtain a calibration precision value with respect to a 234.52 mm movement instruction.

Figure 4:
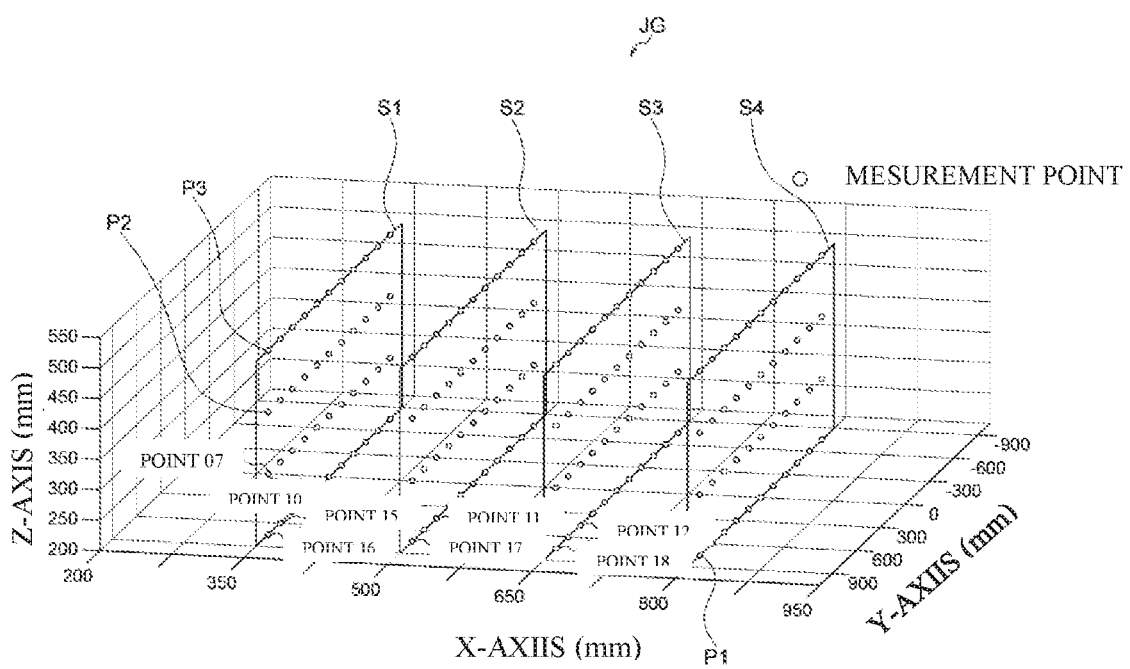
FIG. 4 is an overall perspective view illustrating the three-dimensional lattice structure used in an example embodiment of the present disclosure.

As described above, the 3D lattice structure JG used in calibration evaluation of the present embodiment has more lattice points than the lattice points shown in FIG. 3. Therefore, by using lattice points not shown in FIG. 3, the number of calibration precision values with respect to a 150.00 mm movement instruction may be obtained more than the number described above. In addition, the number of calibration precision values with respect to a 100.00 mm movement instruction may be obtained more than the number described above. For example, the 3D lattice structure JG has one lattice point which is 150.00 mm away from the right side of point 18 in a positive X-axis direction. In addition, the 3D lattice structure JG has eight lattice points inside point 10 in a negative Y-axis direction. The 3D lattice structure JG has two lattice points above point 07 in a positive Z-axis direction. The 3D lattice structure JG is shown in FIG. 4. A plane defined by point 01, point 10, point 16, point 07, and point 01 of FIG. 3 is plane S1 of FIG. 4. A plane defined by point 02, point 11, point 17, point 08, and point 02 of FIG. 3 is plane S2 of FIG. 4. A plane defined by point 03, point 12, point 18, point 09, and point 03 of FIG. 3 is plane S3 of FIG. 4. Plane S4 is the same surface as plane S3 and is 150 mm away from plane S3 in the positive X-axis direction. When the 3D lattice structure JG of FIG. 4 is used, 132 (33×4) calibration precision values with respect to a 100.00 mm movement instruction may be obtained (wherein 33 calibration precision values are obtained from each of planes S1 to S4).

In the 3D lattice structure JG of FIG. 4, the arm tip of the robot may be moved from point 16 to point P1 (point in right of point 18) to obtain a calibration precision value with respect to a 450.00 mm movement instruction. The arm tip of the robot may be moved from point 16 to point P2 (point above point 07) to obtain a calibration precision value with respect to a 200.00 mm movement instruction. The arm tip of the robot may be moved from point 16 to point P3 (point above point P2) to obtain a calibration precision value with respect to a 300.00 mm movement instruction. The arm tip of the robot may be moved from point 15 to point P2 to obtain a calibration precision value with respect to a 250.00 mm movement instruction. Therefore, by using two lattice points (pair of lattice points) spaced apart from each other by a certain distance among lattice points of the 3D lattice structure JG, it is possible to obtain calibration precision with the certain distance as a movement instruction value. In addition, it is not necessary to obtain calibration precision using all of a plurality of lattice points included in the 3D lattice structure JG. It is just sufficient to be able to obtain a sufficient number of calibration precision values to determine whether calibration precision is high or low.

Figure 5:
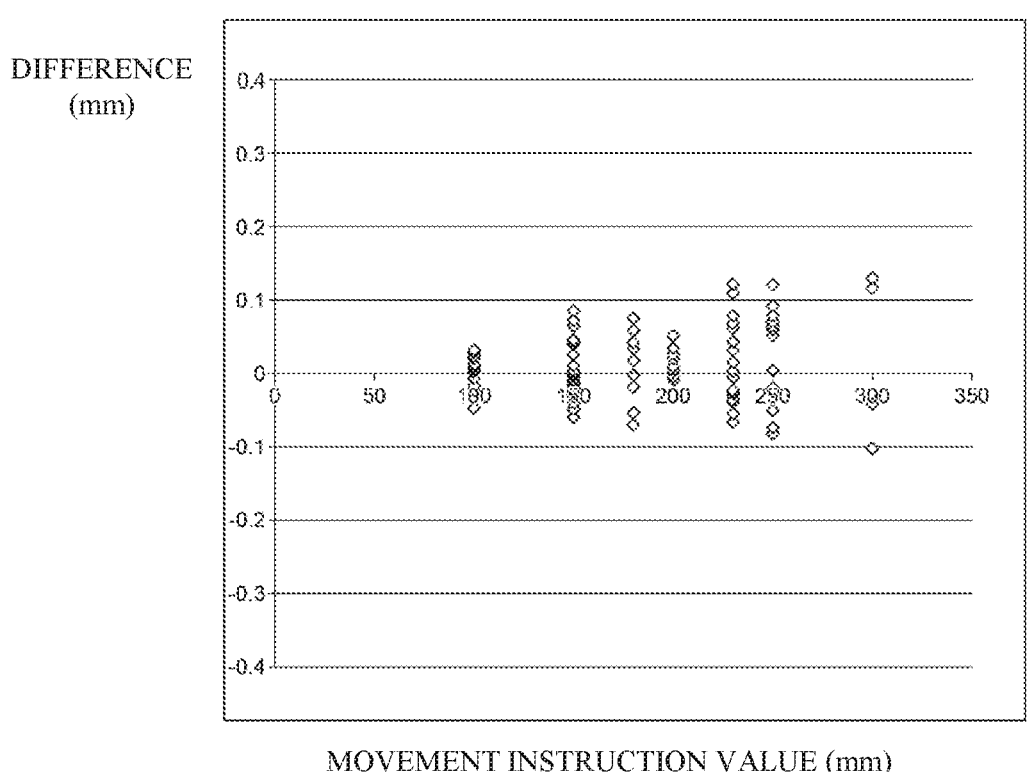
FIG. 5 is a graph showing calibration precision.

Calibration precision obtained using the 3D lattice structure JG of FIG. 4 is shown in a graph of FIG. 5. A vertical axis of FIG. 5 shows a difference between a movement instruction value and an actual distance by which the arm tip is moved. A horizontal axis of FIG. 5 shows a movement instruction value. Symbols ◇ of FIG. 5 indicate results of plotting calibration precision values obtained using the 3D lattice structure JG of FIG. 4 (wherein the calibration precision value is a difference between the movement instruction value and the actual distance by which the arm tip is moved). In FIG. 5, as an example, calibration precision in each of cases in which movement instruction values are 100 mm, 150 mm, 180.28 mm, 200 mm, 234.52 mm, 250 mm, and 300 mm is plotted as the symbol ◇.

Therefore, in the present embodiment, a difference between a movement instruction value given to the robot and an actual distance by which the arm tip of the robot is moved is repeatedly calculated using a plurality of pairs of lattice points, and the calculated differences, as shown in FIG. 5, are presented. The presentation can be made, for example, by displaying the graph of FIG. 5 on a display unit of the controller.

When an allowable value of a movement error when the arm tip of the robot is moved from a certain point to another point is 0.1 mm, it is determined whether a value of a difference on the vertical axis of FIG. 5 is within a range of +0.1 mm to −0.1 mm. When the difference shown in FIG. 5 is within the range of +0.1 mm to −0.1 mm, it can be evaluated that calibration precision is sufficiently high. If not, it is evaluated that the calibration precision is not sufficient. In this case, calibration is performed again until the difference shown in FIG. 5 is within the range of +0.1 mm to −0.1 mm.

For example, it is assumed that a plurality of components are placed on a pallet at intervals of 150 mm. Positions where the plurality of components are placed are referred to as a first position, a second position, a third position, etc. In addition, it is assumed that calibration precision of 150 mm movement of the robot is set to be 0.1 mm or less. In this case, first, the first position is taught to the robot. The component at the first position is picked up by the robot. Thereafter, when the component at the second position is picked up by the robot, it is not necessary to teach the robot into the second position. The robot only needs to be instructed to move 150 mm from the first position to pick up the component. When the calibration precision is 0.1 mm or less, the robot may precisely pick up the component at the second position.

As shown in FIG. 5, when a movement instruction value is in a range of 100.00 mm to 200.00 mm, calibration precision is 0.1 mm or less, but when a movement instruction value is in a range of 234.52 mm to 300.00 mm, calibration precision exceeds 0.1 mm. Therefore, at the point at which calibration precision is calculated, when a movement distance of the arm tip is within 200 mm, it may be considered that the robot 1 may precisely transfer the component (when an allowable value of the movement distance is 0.1 mm or less). When the robot 1 is desired to be used by setting a movement distance of the arm tip of the robot 1 to be 250 mm or more, it may be considered that calibration precision at the present moment may be shifted by 0.1 mm or more relative to a movement instruction value. Thus, the robot 1 is taught that a position of the arm tip of the robot 1 is shifted relative to the movement instruction value. Therefore, on the basis of a result of the calibration evaluation, it is possible to know a range (high precision movement range) in which the arm of the robot 1 may be moved with high precision. When a movement instruction value given to the robot 1 is within the high precision movement range, it is not necessary to teach the robot 1. Thus, it is not necessary to perform an extra teaching operation.

According to the present embodiment, the calibration precision of the robot may be evaluated by measuring a movement distance of the arm tip of the robot. That is, in the present embodiment, when the calibration precision is evaluated, relative precision is used without using so-called absolute precision. When the absolute precision is used, it is necessary to match coordinates of the robot and coordinates of a position measuring instrument (laser tracker), but it is very difficult to match the coordinates of the robot and the coordinates of the position measuring instrument. For example, a transformation matrix between the coordinates of the robot and the coordinates of the laser tracker includes many parameters such as a position of a laser, a position of the robot, and a calculation error so that accurate transformation may not be performed. In the present embodiment, the calibration precision is evaluated based only on a movement distance when the arm tip of the robot is moved from one lattice point of the 3D lattice structure to another lattice point which is spaced a certain distance from the one lattice point. That is, the calibration precision is evaluated using relative precision without using absolute precision. Therefore, according to the present embodiment, it is possible to easily evaluate the calibration precision. When the calibration precision is evaluated based on a movement distance, precision of a coordinate system of the robot does not matter.

In FIG. 3, after the arm tip of the robot is sequentially moved from point 01 to point 09 to obtain calibration precision, the arm tip of the robot may be sequentially moved in a reverse direction, i.e., from point 09 to point 01 to obtain calibration precision. This is because, for example, it is assumed that calibration precision obtained by moving the arm tip of the robot from point 01 to point 02 is not equal to calibration precision obtained by moving the arm tip of the robot from point 02 to point 01.

Although the embodiment of the present invention is described for an application using a six-axis robot, the application is not limited to the six-axis robot.

The present embodiment may be applied to any robot as long as the robot has an arm.

In addition, although the laser tracker is used as the position measuring instrument, other position measuring instruments may be used.

In the above-described embodiment, the arm tip of the robot is sequentially moved from point 01 to point 09 to calculate calibration precision, but movement order of the arm tip of the robot is not limited thereto. For example, first, the arm tip of the robot may be moved from point 01 to point 06 to obtain calibration precision. In this case, for example, the arm tip of the robot is moved from point 01 to point 06, and then is moved to point 07, point 08, point 05, point 02, point 03, point 04, and point 09.

In the above-described embodiment, an interval between the lattice points of the 3D lattice structure JG is 150.00 mm in an X-axis direction, 150.00 mm in a Y-axis direction, and 100.00 mm in a Z-axis direction, but this is merely an example. For example, the interval between the lattice points may be 100.00 mm in all of the-X axis direction, the-Y axis direction, and the-Z axis direction. In this case, the 3D lattice structure JG has a cubic shape. In addition, the interval between the lattice points of the 3D lattice structure JG may be adjusted according to a size of a robot for evaluating calibration precision. For example, in the case of a large robot with a wide operating range, the interval between the lattice points of the 3D lattice structure JG is in several centimeters. On the other hand, in the case of a small robot having a narrow operating range, the interval between the lattice points of the 3D lattice structure JG is in several millimeters.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of evaluating calibration precision, the method comprising:
   a setting step of setting a three-dimensional lattice structure including a plurality of lattice points;
   a movement instructing step of moving an arm tip of a calibrated robot from a first lattice point of the plurality of lattice points to a second lattice point of the plurality of lattice points spaced a certain distance from the first lattice point;

a calculating step of calculating a difference between a movement instruction value given to the robot and an actual distance by which the arm tip of the robot is moved;

a repeat controlling step of repeating the movement instructing step and the calculating step a certain number of times using a pair of the plurality of lattice points other than the first and second points; and a presenting step of presenting a plurality of differences obtained by the repeat controlling step.

2. The method of claim 1, wherein the repeat controlling step is performed using all pairs of the plurality of lattice points of the three-dimensional lattice structure.

3. The method of claim 1, further comprising an obtaining step of obtaining the actual distance by which the arm tip of the robot is moved using a laser tracker.

4. The method of claim 1, wherein the steps from the movement instructing step to the presenting step are performed at least one time by changing the certain distance.

5. The method of claim 1, wherein the robot is a six-axis robot.

* * * * *